US007286242B2

United States Patent
Kim et al.

(10) Patent No.: US 7,286,242 B2
(45) Date of Patent: Oct. 23, 2007

(54) APPARATUS FOR MEASURING CHARACTERISTICS OF THIN FILM BY MEANS OF TWO-DIMENSIONAL DETECTOR AND METHOD OF MEASURING THE SAME

(75) Inventors: Yeong Ryeol Kim, Daejeon (KR); Ji Jong Park, Daejeon (KR); Jin Yong Kim, Daejeon (KR); Joong Whan Lee, Daejeon (KR)

(73) Assignee: KMAC, Daejeon (KR)

( * ) Notice: Subject to any disclaimer, the term of this patent is extended or adjusted under 35 U.S.C. 154(b) by 208 days.

(21) Appl. No.: 10/489,108

(22) PCT Filed: Sep. 23, 2002

(86) PCT No.: PCT/KR02/01795

§ 371 (c)(1),
(2), (4) Date: Mar. 10, 2004

(87) PCT Pub. No.: WO03/025497

PCT Pub. Date: Mar. 27, 2003

(65) Prior Publication Data

US 2004/0246493 A1 Dec. 9, 2004

(30) Foreign Application Priority Data

Sep. 21, 2001 (KR) ............................. 2001/58535
Sep. 23, 2002 (KR) ............................. 2002/57581

(51) Int. Cl.
*G01B 9/02* (2006.01)
(52) U.S. Cl. .................................................. 356/504
(58) Field of Classification Search ................ 356/504, 356/503, 498, 630, 482, 485, 492
See application file for complete search history.

(56) References Cited

U.S. PATENT DOCUMENTS

| 3,804,532 | A | * | 4/1974 | Patten et al. ................. 356/504 |
| 4,308,586 | A | * | 12/1981 | Coates ........................ 356/504 |
| 4,999,014 | A | * | 3/1991 | Gold et al. ................. 356/632 |
| 4,999,508 | A | | 3/1991 | Hyakumura |
| 4,999,509 | A | | 3/1991 | Wada et al. |
| 5,042,949 | A | * | 8/1991 | Greenberg et al. .......... 356/451 |
| 5,129,724 | A | * | 7/1992 | Brophy et al. ............. 356/503 |
| 5,227,861 | A | | 7/1993 | Nishizawa et al. |
| 5,333,049 | A | | 7/1994 | Ledger |
| 5,365,340 | A | | 11/1994 | Ledger |
| 5,410,411 | A | | 4/1995 | Uchida et al. |
| 5,450,205 | A | * | 9/1995 | Sawin et al. ................. 356/632 |

(Continued)

FOREIGN PATENT DOCUMENTS

CN 1144906 A 3/1997

(Continued)

*Primary Examiner*—Samuel A. Turner
(74) *Attorney, Agent, or Firm*—Rothwell, Figg, Ernst & Manbeck

(57) ABSTRACT

The present invention relates to a non-contact, non-destructive measuring apparatus that measures thickness profile and refractive index distribution of a single or multiple layers of thin films by means of the principle of reflectometry. According to the present invention, by employing more than one narrow band-pass optical filters and a two-dimensional array of CCD sensors, and by finding an optimal solution for the nonlinear functional relationship between the thickness of said thin film or thin films and the corresponding refractive indexes by using an iterative numerical computation method, said apparatus simultaneously measures local areawise thickness profile and refractive index distribution among others of said a single layer or multiple layers of thin films on a substrate.

41 Claims, 7 Drawing Sheets

U.S. PATENT DOCUMENTS

| | | | | |
|---|---|---|---|---|
| 5,555,472 A | * | 9/1996 | Clapis et al. | 356/504 |
| 5,587,792 A | | 12/1996 | Nishizawa et al. | |
| 6,057,925 A | * | 5/2000 | Anthon | 356/419 |
| 6,130,750 A | * | 10/2000 | Ausschnitt et al. | 356/401 |
| 6,639,674 B2 | * | 10/2003 | Sokolov et al. | 356/369 |

FOREIGN PATENT DOCUMENTS

| | | | |
|---|---|---|---|
| JP | 07091921 | | 4/1995 |
| JP | 2000513102 | * | 10/2000 |
| JP | 2000310512 | * | 11/2000 |
| JP | 2001021317 | * | 1/2001 |
| JP | 2001153620 | | 6/2001 |
| JP | 2002090295 | | 3/2002 |
| JP | 2001041713 A | * | 2/2006 |
| WO | WO93/17298 | * | 2/1993 |
| WO | 9845687 A1 | * | 10/1998 |

* cited by examiner

APPARATUS FOR MEASURING CHARACTERISTICS OF THIN FILM BY MEANS OF TWO-DIMENSIONAL DETECTOR AND METHOD OF MEASURING THE SAME

BACKGROUND OF THE INVENTION

1. Field of the Invention

The present invention relates to techniques for measuring thickness profile and refractive index distribution of multiple layers of thin films by means of two-dimensional reflectometry.

2. Description of the Related Art

The process of measuring thickness profile and associated refractive index distribution of multiple layers of thin films on a substrate as a part of thin film coating process in manufacturing semiconductors, displays such as LCDs and others plays a key role in reducing the process costs by improving quality and screening defective products in early stages of the production cycle through accurate and consistent observation and monitoring of thin film formation process on a substrate.

Widely used apparatus for measuring thickness and refractive index of thin films in semiconductor industry is reflectometry-based measuring tools. In a broad sense, a reflectometer called "Thin Film Layer Measurement System" is a non-contact, non-destructive measuring apparatus, which is capable of measuring the properties of multiple layers of thin films, and also is capable of direct measurement without requiring any special pre-preparation process of target samples prior to measurement.

FIGS. 1a and 1b show a schematic drawing of the structure of a commonly used reflectometer. Referring to FIGS. 1a and 1b, the light generated from a light source 100 is reflected by a beam splitter 102 and passes through an object lens 104 and is directed onto a sample thin film 110 on a sample substrate 108. The sample substrate 108 consists of a substrate 106 and a sample thin film 110 formed on said substrate 106. The light incident onto the sample thin film 110 is partly reflected at the surface 112 of said sample thin film 110, that is, at a point 116 on the boundary 112 between the sample thin film 110 and the air. The rest of the incident light penetrates into said sample thin film 110 and then reflected at the surface 114 of said substrate 106, that is, at the boundary 114 between sample thin film 110 and said substrate 106. This reflected light passes through said object lens 104, said light splitter 102 and through a hole 120 on a reflector 118, and then finally reaches a spectroscope 130, after which the incoming reflected light is detected and analyzed to find the intensity of the reflected light as a function of wavelength. These results are processed by a numeric converter 132 and also by the information processor 134 to compute the thin film thickness and the corresponding refractive index among others.

In the above example in reference to FIG. 1a, the incident light is reflected in part at the point of incidence 116 on the surface 112 (or the boundary 112.) of a sample thin film 110 and the other part passes through the boundary 112 and refracts or penetrates into the sample thin film 110, and in turn this refracted light is reflected in part at the boundary 114 between the sample thin film 110 and the substrate 106 and the rest of the refracted light refracts or penetrates into the substrate 106.

In FIG. 2, two different thin film layers are considered for illustration. Referring to FIG. 2, an incident light 210 that passes through the object lens 104 in FIG. 1a, is reflected in part at a point 217 on the first boundary 207 and the reflected light 222 travels in the direction of 222, and the other part of the incident light 210 refracts into the first thin film layer 202 shown as 212. This refracted light 212, in turn, is reflected at a point 218 on the second boundary 208 and this reflected light travels through the first layer 202 and then to the air in the direction of 224, and the other part of the light 214 refracts into the second thin film layer 204 at a point 218 on the second boundary 208 shown as 214. This refracted light 214 at the point 218, likewise, is reflected at a point 219 on the third boundary 209, and then passes through two layers of thin films 204 and 202, and travels in the air in the direction of 226. Finally, the other part of the reflected light 214 refracts or penetrates in into the substrate 206 in the direction of 216.

As illustrated in FIG. 2, the reflected lights of 222, 224 and 226 from the sample substrate 230, travels in parallel in the air with very small differences in optical paths in terms of absolute point of travel of the reflected lights. In other words, these reflected lights of 222, 224 and 226 travel in parallel in the air seeing from the reference starting line 228 in the air after being reflected at the optical boundaries 207, 208 and 209. As a result, interference phenomena occur. Here, these very small optical path differentials among three reflected lights of 222, 224 and 226 occur as a function of the wavelength of the reflected lights. As a result depending upon the wavelength, the path differentials may cause either mutually re-enforcing interference or mutually canceling interference.

Due to such interference phenomena described above, the plot of reflectivity as a function of wavelength of the reflected light takes a typical form of graph as shown in FIG. 3, whereby the horizontal axis is wavelength and the vertical axis is reflectivity, which is defined as the ratio of the intensity of the reflected light and the incident light intensity.

Referring to FIG. 1a, the reflected light from said sample substrate 108 is a superimposed wave of many wavelengths, thereby it is necessary to find the reflectivity as a function of wavelength, and such wavelength separation takes place in the spectroscope 130. Physically, a prism is a simplest form of a spectroscope, but such wavelength separation is commonly carried out using a diffraction grating to generate monochromatic wavelength. Accordingly, either a monochromator equipped with a rotational type of a diffraction grating and a single light detector on a fixed type of diffraction grating and an array type of light detectors are used for detecting the intensity of the reflected lights as a function of wavelength, thereafter a reflectivity for each wavelength is computed by means of an information processor 134 after transforming the detected reflectance intensity information into numbers by using a numeric converter 132.

The reflectivity graph as shown in FIG. 3, has a unique shape or form depending upon the characteristics of the thin film thickness as well as the refractivity distribution of the thin film and the substrate. In case of a single layer of thin film, the reflectivity is given theoretically as a closed form. However, in case of multiple layers of thin films, the reflectivity can be computed by using the relationship between the electric field and the magnetic field expressed by the products of characteristic matrices, one for each thin film layer. Therefore, the resultant characteristic matrix represents all layers of thin films as a "system". Unlike in case of a single layer of thin film, whereby the three parameters of refractive index, thin film thickness and reflectivity are related functionally and deterministically, said resultant characteristic matrix for multiple layers of thin film may be rearranged as nonlinear functions, and such nonlinear functions of multiple variables can be "solved" practically, in many cases, by using a method of finding a "best" or an "optimum" solution by means of an iterative trial-and-error method. More specifically, when a reflectivity graph such as the one shown in FIG. 3 is given, for each point of wavelength by choosing the thin film thickness as a variable, selecting its initial value, using such initial value as a starting paint to find a calculated reflectivity by using said nonlinear functional equation, finding an error between the calculated and measured reflectivity values, and then repeating this process iteratively by using different values for the thin film thickness until a value for the thin film thickness that minimizes the error values for the thin film thickness, can be determined, and such values are the "best" estimates for the thickness. Here, the intensity of the incident light for calculating the reflectivity value is determined by using a known sample substrate and light source.

Refractive index is computed from the reflectivity and related information obtained above. Such method is known as a class of "model-based measurement method". The principle of reflectometry is used to find the thickness of thin films or refractive indices by means of finding a "best" solution using the iterative trial-and-error method described above.

Commonly and widely used reflectometer measures the thin film thickness at a selected "spot" on a production substrate in order to find the uniformity of a given thin film. In order to carry out a measurement, in FIGS. 1a and 1b, through a light-detecting hole 120 of 200 µm in diameter located in the middle of a reflector 118, only a small portion of the reflected light is taken out of the projected image 122, that is, only the reflected light going through the light-detecting hole 120 is used for measuring thin film thickness.

Depending upon the spectroscope used, a glass fiber 424 of 200 µm in diameter as shown in FIG. 4 is used for collecting the reflected lights for measuring thin film thickness. That is, a hole of 200 µm is made on the upper plate 423 in order to accommodate a glass fiber of 200 µm in diameter and as illustrated in FIG. 1b, only the image of the size of 200 µm in diameter is used for measurement out of the entire projected image 122.

On the other hand, a method and apparatus of measuring thickness profile over a large area is disclosed by A. M. Ledger in U.S. Pat. No. 5,333,049. According to Ledge's invention, an apparatus that measures a thickness profile of a silicon wafer as large as 100 mm has been realized using a white light source and the principle of interferometry, whereby the method of measurement is to divide entire wafer into 400 small regions. At each region, reflectivity is measured and compared with an already prepared standard reflectivity vs. thickness table to determine a thickness value at a selected region, whereby said standard reflectivity vs. thickness table is prepared in advance using a calibration wafer and by dividing the scale of thickness into 500 divisions.

In other words, a thickness value is read from a look-up table after measuring a value of reflectivity. This method has advantages of speedy measurement and capability of observing the entire substrate area, but it has also disadvantages of potentially propagating any errors or inaccuracies that many be imbedded in the reflectivity vs. thickness table generated for a calibration substrate to production substrates, and also it has a disadvantage of not being able to obtain sufficient resolution for covering the entire production substrate surface of more than 100 µm in diameter by using the CCD sensors commonly used in video cameras. Here, the problem of resolution arises when a specific part of the electronic circuitry on a substrate is to be inspected during a semiconductor wafer process of high circuit density, because there is a necessity of observing and inspecting thin film thickness and the state of its profile of the surface of a wafer that contains high circuit density. Furthermore, another disadvantage of Ledger's invention is to generate in-situ a new database of reflectivity vs. thin film thickness table of a new calibration substrate whenever the wafer process is changed. Also, another disadvantage of aforementioned Ledger's patent is that the noise contained in the measured reflectivity value of a production substrate reflected in determining thin film thickness value, thereby inaccurate thickness values of the thin film on a calibration substrate is propagated to production substrates. In order to overcome some of these deficiencies, in another U.S. Pat. No. 5,365,340, Ledger disclosed a method of measuring thickness of a thin film by self-normalizing the measured values of reflectivity of a production substrate and comparing these self-normalized values with the values of the database of a calibration substrate, whereby the self-normalization of the measured values of reflectivity is carried out by minimizing the computed values of a merit function. However, all the remaining deficiencies accompanied by the aforementioned U.S. Pat. No. 5,333,049 still apply to U.S. Pat. No. 5,365,340.

The common and serious deficiency shared by aforementioned U.S. Pat. No. 5,333,049 and U.S. Pat. No. 5,365,340 is that the resulting measured values of a thin film thickness are influenced too much by the values of the database of a calibration wafer because the values of a thin film thickness are determined by comparing the measured thickness values with the pre-prepared database by using a calibration substrate. In other words, the reflectivity vs. thin film thickness database of a calibration substrate is simply a table representing a correspondence relationship between the reflectivity and thin film thickness, which table is generated by taking averaged and arranged values over the entire calibration substrate, and therefore, its accuracy is guaranteed when a fair degree of uniformity exists in measured thickness and reflectivity of a calibration substrate as well as production substrates. However, the thin film thickness accuracy decreases when there exist irregular relationships between the reflectivity and the thin film thickness due to the bumpy surface condition of the substrates.

In order to overcome some of the deficiencies described above, Paul J. Clapis and Keith E. Daniell U.S. Pat. No. 5,555,472 disclosed a process of optimally determining the values of a thin film thickness by minimizing the error value between the reflectivity values measured at many points on the surface of a production substrate and the theoretical signatures from a library constructed by computing the values of a signature such as reflectivity using a theoretical numerical expression of the same signature. This method is used for measuring thickness of two layers of thin films under the assumption that at least one layer is reasonably uniform.

Three prior arts described above are about the apparatuses measuring over the entire substrate. Hence, the CCD camera used for measuring a thin film thickness over the entire substrate area has a limited resolution and, in particular, the measurement of a thin film thickness profile in detail over a limited area becomes a serious problem as well as the aforementioned "noise" is introduced in the measuring apparatus and such noise is propagated to production substrates. On the other hand, for example, U.S. Pat. No. 4,999,014, U.S. Pat. No. 4,999,508 and U.S. Pat. No. 4,999,509 disclose methods of determining the values of thin film thickness by "spot" measuring the reflectivity of a thin film on a production substrate. These apparatuses are typical thin film thickness measuring devices utilizing existing spectroscopy and they measure thickness and refractive index of a thin film at a specific point. However, it is generally insufficient to evaluate the property and quality of a thin film with only the measurement information on the thin film thickness and corresponding refractive index at one point. Instead, if the thin film thickness profile and refractive index distribution can be measured over an extended area, such information can be useful in obtaining much more meaningful results in evaluating the property and quality of a thin film rather than the information obtained by measuring at one spot at a time. Furthermore, currently existing spectroscope is unsuitable for measuring thin film thickness profile over a relatively large area or measuring the thin film thickness distribution over many neighboring points at the same time. Of course, it is quite possible to measure the thin film thickness distribution by repeatedly measuring the thickness while moving the sample substrate in four X-Y directions in steps, but such operation requires a fine micro-manipulator and is very time consuming. Moreover, in order to obtain a thin film thickness distribution, a precision substrate moving platform should be used and have a capability of moving with better than 0.1 micron in step resolution, and therefore, the entire measuring apparatus become very complex both functionally and structurally and very expensive. In such a case, it is possible to employ a highly priced super micro-manipulator, but it is not practical from the economic point of view.

SUMMARY OF THE INVENTION

As aforementioned, it is practically impassible to carry out the concurrent measurement of thickness profile of a thin film and refractive index utilizing conventional reflectometer and also it is very costly to make an apparatus for measuring thickness profile in steps over the given area on a thin film, and this process requires time to carry out the measurements. In order to overcome such deficiency, a new apparatus and method of measuring thin film thickness profile and refractive index is disclosed in the present invention.

The primary purpose of the present invention is to disclose an apparatus not only the apparatus capable of measuring thickness profile along with refractive index of a thin film at many points in a given area on a sample substrate, thereby the thickness profile as well as the refractive index together are measured in a short period of time, but also the structure of the new apparatus is simple due to the use of the principle of commonly used reflectometry. Herewith, refractive index is usually computed from reflectivity whereby in the present invention the reflectivity is optimally determined by locally minimizing the error between the measured reflectivity and the iteratively computed one using a non-linear functional expression relating thickness and refractive index of a thin film based upon optical principles described in the following section.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 5:
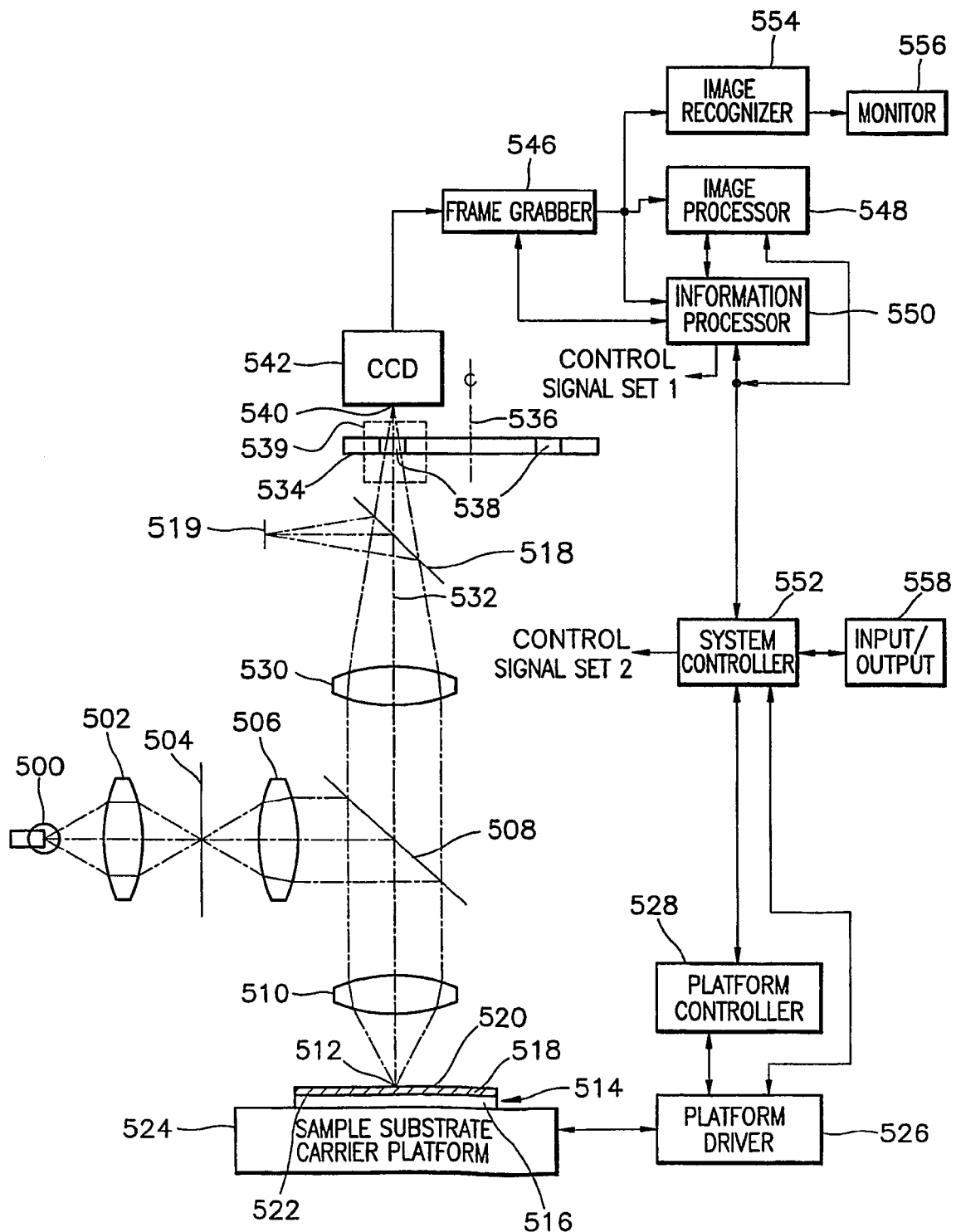
FIG. 5 is a schematic drawing of an apparatus for measuring thickness profile and refractive index distribution among others according to the present invention.

FIG. 5 is a schematic drawing of a new apparatus for measuring thickness profile and refractive index of a thin film according to the present invention. Referring to FIG. 5, the apparatus for measuring thickness profile and refractive index distribution of a thin film, as an example according to the present invention, comprises five blocks, i.e., an optical unit, a substrate carrier, a picture image acquisition processor, an image processor 548, an information processor 550, a system controller 552, and an information display unit.

The optical unit is composed of a light producing light source 500, a condensing lens 502, an iris 504, a collimator lens 506 (the first collimator lens), a light splitter 508, an object lens 510 (the second collimator lens), an auxiliary lens 530 (the third collimator lens), and an optical filter wheel 534 that is equipped with a plural of narrow band-pass optical filters 538. As a light source 500 for measuring thickness of a thin film, a visible light source is commonly used. The light generated from this light source passes through a condensing lens 502, an iris 504 that adjusts the area of the projected light on the surface of the sample substrate 514, and another collimator lens 506 and reaches at a light splitter 508, and reflected form the light splitter 508, and is redirected towards a sample substrate, passes through the object lens 510 and then incident onto, for example, a sample thin film 518, where the light is reflected at the boundary I 520 on the top surface and at the boundary II 522 on the bottom surface of the sample substrate. The reflected light from the sample substrate passes through the object lens 510, the light splitter 508, and the auxiliary lens 530 which is a collimator lens that focuses the reflected light so that the reflected light passes through a narrow band-pass optical filter 538 and then is finally focused at the two-dimensional array type of CCD (charge coupled device) sensors mounted in a light detector 542. The reflected light that passes through a narrow band-pass optical filter 538 has a specific wavelength associated with the given filter wheel position, is projected onto the two-dimensional array CCD type of a light detector 542.

The picture image acquisition processor comprises a two-dimensional CCD array type of light detector 542 and a frame grabber 546. The lights reflected from both boundary I 520 and boundary II 522 of a thin film layer 518 of a sample substrate 514 pass through the light path consisting of an object lens 510, a light splitter 508, an auxiliary lens 530 and a narrow band-pass optical filter 538, and are then projected onto a two-dimensional CCD light detector 542, whereby the picture image projected onto a two-dimensional CCD light detector 542 is sensed through the CCD-based light detectors and such sensed information is converted into the light intensity information at the pixel level. The image of this two-dimensional picture frame is captured by the frame grabber 546 and then is stored in the frame memory (not shown). More specifically, inside the two-dimensional light detector 542, CCDs are arranged in a two-dimensional array form. The reflected lights at the boundary I 520 and the boundary II 522 of a sample thin film layer 518 pass through a narrow band-pass optical filter 538, after which only the light with the wavelength corresponding to said narrow band-pass optical filter used is projected onto a two-dimensional array type of CCDs 542, therein the pixel information sensed and detected by said CCD light detector 542 form a two-dimensional pixel group. In turn, this group of pixels detected by said CCD detector 542 is captured by a frame grabber 546 and stored in a frame memory (not shown).

Substrate carrier platform assembly unit consists of a substrate carrier platform 524, a substrate carrier platform driver 526, and a substrate carrier platform controller 528. The substrate carrier platform 524 is primarily a stage supporting a substrate 514 and moves left-right and up-down directions and such movements are controlled by a set of motors or platform driver 526, and in turn said substrate carrier platform driver 526 is controlled by a substrate carrier platform controller 528, which is controlled by a system controller 552, and said system controller 552 interfaces with an input/output unit 558.

Figure 7:
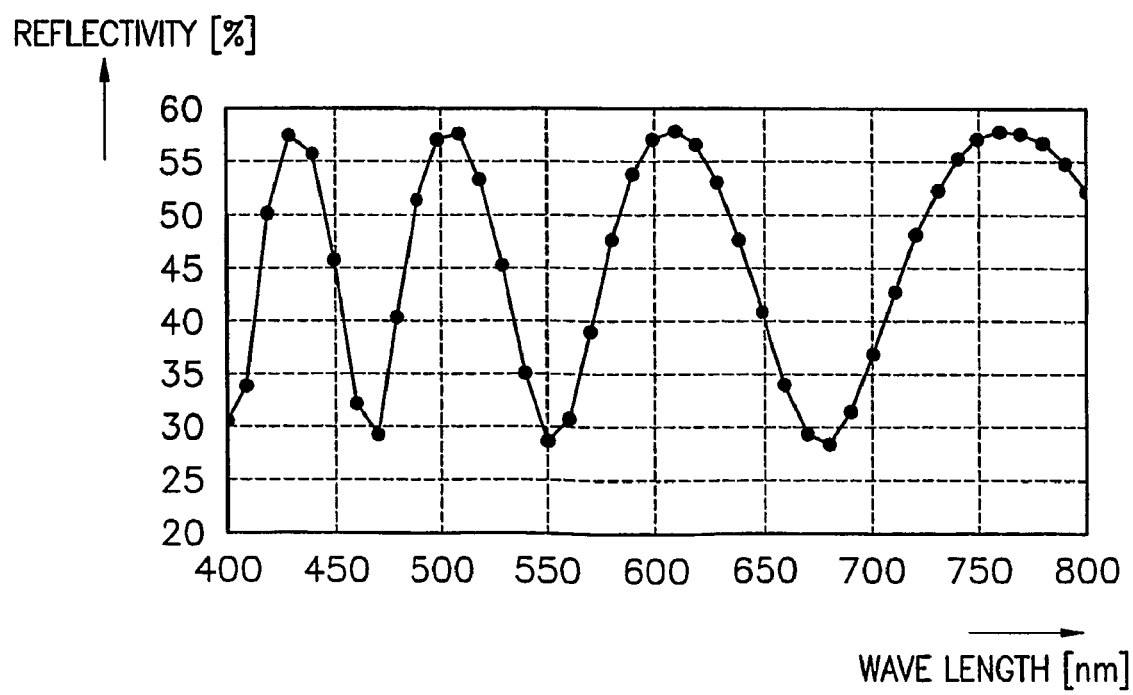
FIG. 7 is a typical reflectograph showing the measured values of reflectivity as a function of wavelength using an optical filter wheel.

Image processor 548 produces data for generating a reflectivity graph such as the one shown in FIG. 7 by extracting reflected light intensity as a function of wavelength from the image information captured by frame grabber 546. Here, reflectivity is defined as a ratio of reflected light intensity and the intensity of the incident light, where incident light intensity is measured using a known sample substrate.

Information processor 550 is functionally a class of parameter value manipulator-calculator, and thin film thickness, thickness profile and refractive index values of a thin film in two dimensions are mainly calculated by starting with a reflectivity graph such as the one shown is FIG. 7 Depending upon one's design, image processor 548 and information processor 550 may be included in one controller, thereby requiring only one controller. Furthermore, image process 548, information processor 550, system controller 552 and platform controller 528 may be combined by design, so that they can be controlled by one master controller or a computer.

Image recognizer 554 and monitor 556 displays the information processed and extracted by image processor 548 and information processor 550 based upon the pixel information obtained by frame grabber 546, thereby the measuring apparatus can be operated easily and conveniently by the user of said apparatus. In particular said monitor 556 displays necessary parameters including thin film thickness profile and refractive index, which parameters are extracted or derived by image processor 548 and information processor 550.

System controller 552 controls and manages the entire measuring apparatus including the monitor 556 according to the present invention.

In the following, the operational principles of said apparatus for measuring thin film thickness and refractive index distribution are described in detail in reference to FIG. 5 according to the present invention.

Figure 1A:
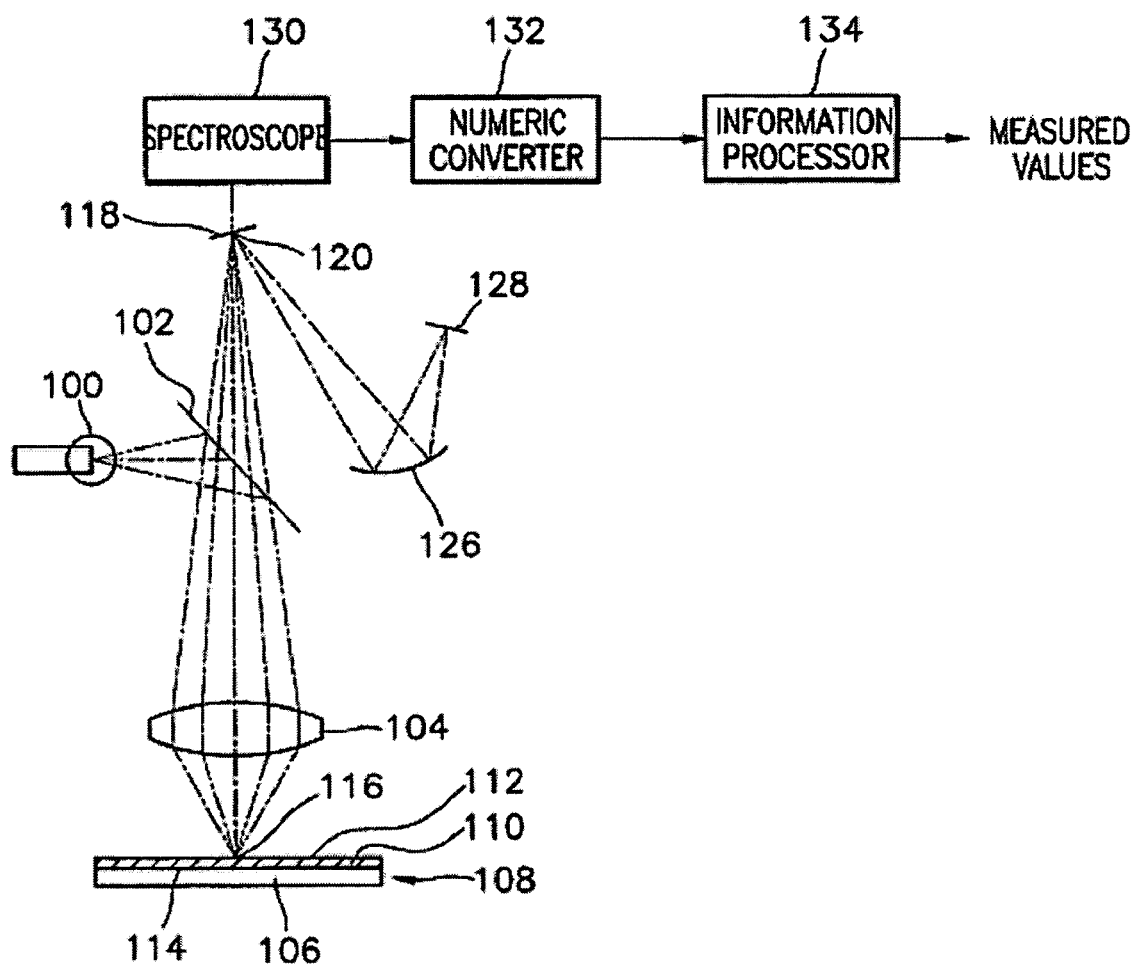
FIG. 1A is a schematic drawing of a prior art illustrating the principle of an existing reflectometer.
Figure 1B:
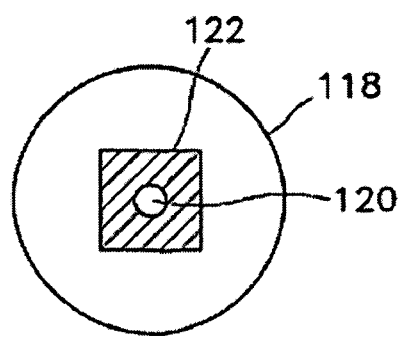
FIG. 1B is a detailed drawing of a small viewing hole located in the middle of a viewing screen used in the reflectometer in FIG. 1A.
Figure 2:
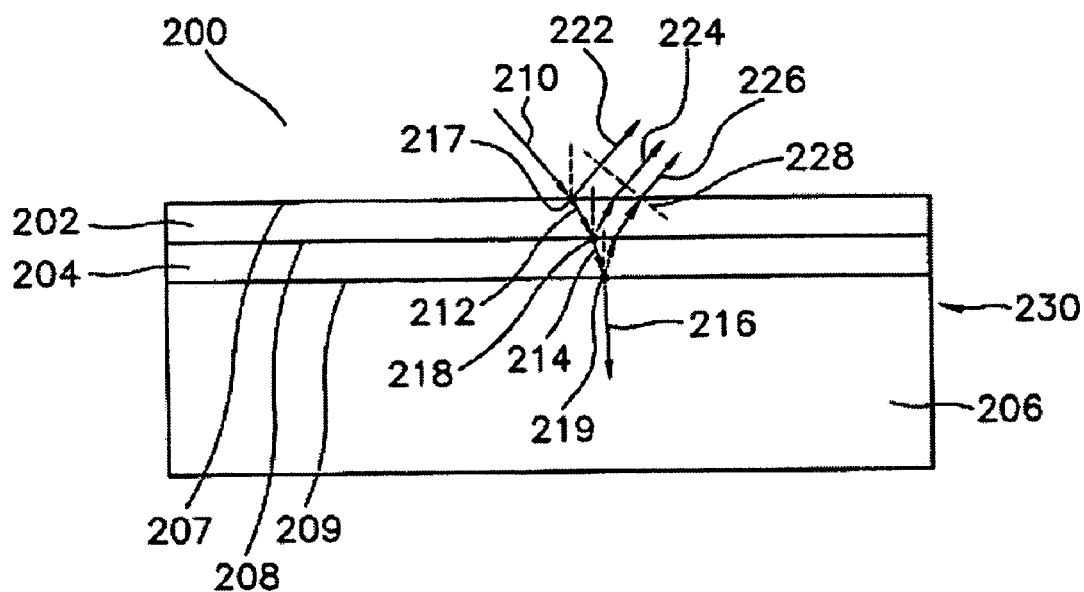
FIG. 2 is an illustrative drawing of various paths of lights at the boundaries of multiple layers of thin films on a substrate due to a light incident onto the top surface of two layers of thin films.
Figure 3:
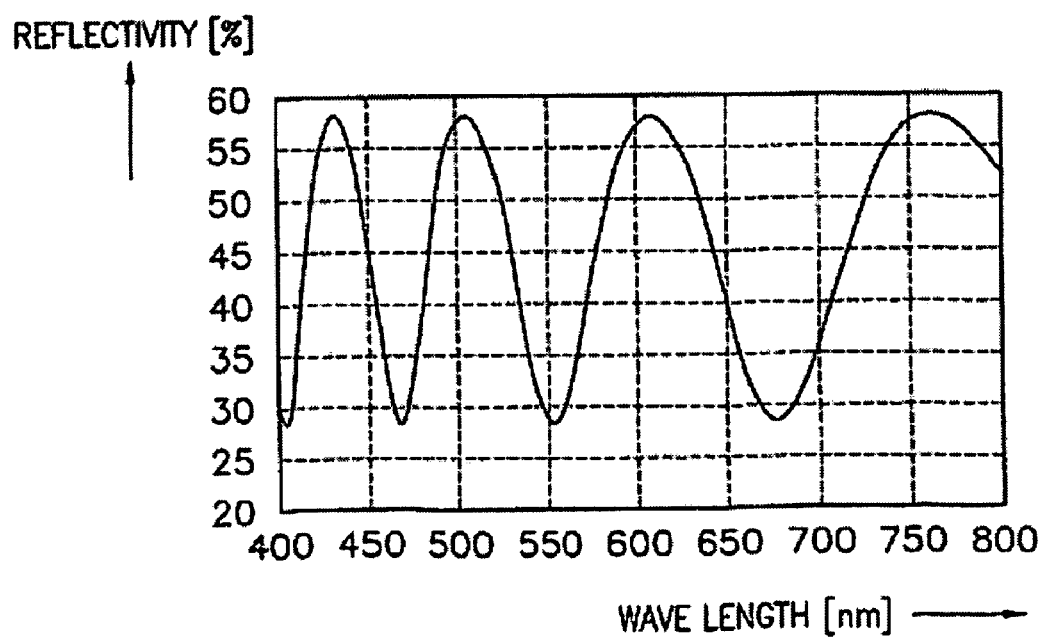
FIG. 3 is a representative reflectograph.
Figure 4:
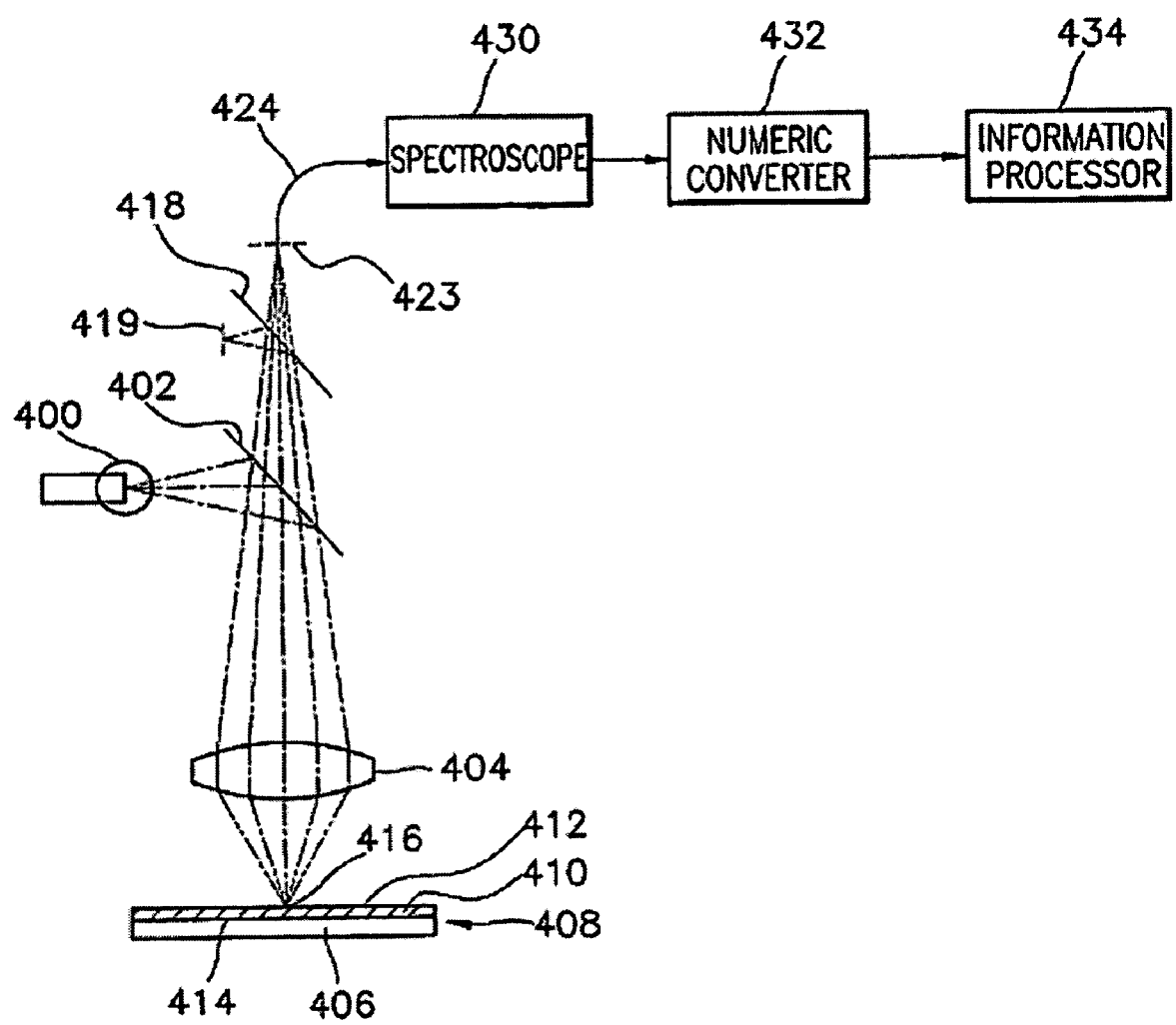
FIG. 4 is a schematic drawing of a prior art reflectometer utilizing a glass fiber tube for collecting and transmitting reflected lights.

The light incident from a light source 500 passes through along a light path consisting of and in the order of a condensing lens 502, an iris 504, a collimator 506, a light splitter 508, an object lens 510, and then projected onto a sample substrate 514. Here, the thin film 518 on a substrate 516 for measurement is assumed to be a two layers of thin films 202, 204 deposited on said substrate 516, in reference to FIGS. 2 and 5 as an example, to produce said substrate 514. Referring to FIG. 2, a production substrate 230 is structured with two layers of thin films 202, 204 on a production substrate 206, on which the first thin layer 204 and then the second thin layer 202 are formed. In this case, the optical properties such as refractive index for each thin film differs each other, and also there exist three boundaries; boundary I 207 is defined as the interface between the second thin film layer 202 and air 200, boundary II 208 is defined as the interface between the second thin film layer 202 and the first thin film layer 204, and boundary III 209 is defined as the interface between the first thin film layer 204 and the substrate 206. At the optical boundaries between thin film layers with different optical characteristics, the phenomena of reflection, refraction and transmission occur. As illustrated in FIG. 2, the reflected lights reflected from the entire sample substrate 230 is a light of superposition of reflected lights 222, 224, 226 which are the reflected lights with light path differentials of 210→222, 210→212→224, 210→212→214→226. In general, a specimen of a thin film to be measured has a thickness varying from tens of Angstroms (Å) to several microns. Therefore, aforementioned reflected lights reflected from the thin films have light path differentials, where these light path differentials are shorter than the optical coherence length, thereby the superimposed light of the reflected lights creates an interference phenomenon as widely known in optics. Furthermore, even if two light paths are the same, their light path differentials are different when the wavelengths differ each other, and as a result, different interference occurs. Accordingly, a destructive interference occurs at certain wavelengths, and a constructive interference occurs at different wavelengths, wherein the intensities of the reflected lights have different values for different wavelengths. Also, the intensities of the incident light and the reflected light have different values depending upon the wavelengths within a given narrow pass band region. Afore-described interference phenomenon is caused from the difference in the refractive indices that varies with the optical properties of the media layers as well as the light path differentials due to the thickness variation of the sample thin film. Since the reflectivity is defined as the ratio of reflected light intensity and the incident light intensity, a reflectivity graph as shown in FIG. 3 is obtained as a function of wavelength of the reflected light when the incident light intensity is measured using a standard calibration substrate.

According to the present invention, a nonlinear functional relationship that relates thickness of a thin film, reflectivity showing the property of a thin film and refractive index, is obtained and, said reflectivity is measured by said method disclosed in the present invention, and then the thickness of a thin film and refractive index are computed by using a method of searching a best solution by means of an iterative trial-and-error method.

According to the present invention, in order to describe the algorithms for finding the best values for the thickness and the refractive index of given thin films, "Optics" by Eugene Hecht, 4th edition, 2002 was referenced primarily for theoretical background material. Also, described in the following is a method of minimization of errors between the computed and measured values of reflectivity for finding thickness profile and refractive index for given thin films, where the method involves with a minimization of reflectivity error by using an iterative trial-and-error method.

For the case of a single layer of a given thin film, when either thickness or refractive index of a thin film is known, the theoretical expression for finding reflectivity is given as a relatively simple "closed form".

However, in case of multiple layers of thin films, the derivation of the algorithms for finding thickness and refractive indices of multiple layers of thin films begins with a graph representing numerically computable theoretical transfer rate that is derivable by using a functional expression given by multiplications of characteristic matrices, one for each layer of the given thin films, which characteristic matrices are derived from the boundary conditions of the electric and magnetic fields for the layers of thin films.

According to the present invention, the light emitted from a light source is projected upon the surface of a sample substrate (plane of incidence) following almost vertical line of incidence through an optical unit, and the case of a single layer of thin film on a sample substrate where the media for the incident light is air-thin film-substrate, is considered first. In this case, referring to FIG. 5, the reflection coefficient r, which is a complex number, is given by a closed form in Expression [1] below, and also the absolute reflectivity R that has a meaning of energy is given as a squared value of the complex quantity r as shown in Expression [2] below;

$$r = \frac{r_{01} + r_{1s}e^{-j2\beta}}{1 + r_{01}r_{1s}e^{-j2\beta}} \quad [1]$$

$$R = r \cdot r^* \quad [2]$$

where $r_{01}$ and $r_{1S}$ are the Fresnel's reflection coefficients, respectively, at the boundary I 520 between air and the top surface of a thin film and the boundary II 522, between the thin film and the top surface of the substrate, $\beta$ is phase shift given by $$\beta = \frac{2\pi \eta d}{\lambda},$$

which represents the phase shift occurring during the transition of the passage of the incident light through the thin film. Here, $\eta$ is refractive index, d is thickness of a given thin film, and $\lambda$ is wavelength, and * represents complex conjugate.

It should be noted here that the thickness of a thin film can be calculated when the phase shift $\beta$ and the refractive index $\eta$, both as a function of the wavelength $\lambda$, respectively, are given. One of the examples utilizing this relationship for finding the thickness of a thin film is the U.S. Pat. No. 5,042,949.

In case of multiple layers of thin films, unlike Expression [1] and Expression [2] for a single layer of thin film, the electric field and the magnetic field of a light at the top and bottom boundaries of the ith layer of thin films has the functional relationship given by Expression [3] below;

$$\begin{bmatrix} Ei \\ Hi \end{bmatrix} = \begin{bmatrix} m_{i,11} & m_{i,12} \\ m_{i,21} & m_{i,22} \end{bmatrix} \begin{bmatrix} E_{i+1} \\ H_{i+1} \end{bmatrix} = M_i \begin{bmatrix} E_{i+1} \\ H_{i+1} \end{bmatrix} \quad [3]$$

where i=1, 2, 3, . . . , p, and the matrix $$Mi = \begin{bmatrix} m_{i,11} & m_{i,12} \\ m_{i,21} & m_{i,22} \end{bmatrix}$$

is the characteristic matrix for the ith layer of a thin film that relates the electric and magnetic fields at the top and bottom boundaries of the ith layer, and each element of $m_{i,11}$, $m_{i,12}$, $m_{i,21}$, and $m_{i,22}$, is a function of complex refractive index and thickness, for the ith layer as well as the corresponding wavelength. From Expression [3], the electric and magnetic fields at the top and bottom boundaries of all p levels of layers of thin films, where the boundary at the top surface which is between air and the top surface of the p th layer of thin film and the boundary at the bottom surface which is between the bottom surface of the 1st layer of thin film and the substrate, are related through the following functional relationship shown in Expression [4] below;

$$\begin{bmatrix} E_1 \\ H_1 \end{bmatrix} = M_1 M_2 \ldots M_p \begin{bmatrix} E_{p+1} \\ H_{p+1} \end{bmatrix} = M \begin{bmatrix} E_{p+1} \\ H_{p+1} \end{bmatrix} = \begin{bmatrix} m_{11} & m_{12} \\ m_{21} & m_{22} \end{bmatrix} \begin{bmatrix} E_{p+1} \\ H_{p+1} \end{bmatrix} \quad [4]$$

where the characteristic matrix $$M = \begin{bmatrix} m_{11} & m_{12} \\ m_{21} & m_{22} \end{bmatrix}$$

is a functional relationship relating the vector $$\begin{bmatrix} E_{p+1} \\ H_{p+1} \end{bmatrix}$$

to the vector $$\begin{bmatrix} E_1 \\ H_1 \end{bmatrix}.$$

The boundary conditions for the electric and magnetic fields at the uppermost boundary and at the lowermost boundary of the ith level of thin film, yields the following matrix equation;

$$\begin{bmatrix} E_{il} + E_{rl} \\ (E_{il} - E_{rl})\gamma_o \end{bmatrix} = M \begin{bmatrix} E_{ill} \\ E_{ill}\gamma_s \end{bmatrix},$$

and by equating element by element in the above matrix expression, and rearranging the terms, the following functional relationships are obtained;

$$1+r=m_{11}t+m_{12}\gamma_s t$$

$$(1-r)\gamma_o=m_{21}t+m_{22}\gamma_s t. \quad [5]$$

where $$r = \frac{E_{rl}}{E_{il}}, t = \frac{E_{tll}}{E_{il}}, \gamma_o = \sqrt{\frac{\varepsilon_o}{\mu}} n_o \cos\theta_{il}, \gamma_s = \sqrt{\frac{\varepsilon_o}{\mu_o}} n_s \cos\theta_{ill},$$

r=amplitude coefficient of reflection, and t=amplitude coefficient of transmission. Solving Expression [5] above for the amplitude coefficient of reflection r, the result is given as follows;

$$r = \frac{\gamma_o m_{11} + \gamma_o \gamma_s m_{12} - m_{21} - \gamma_s m_{22}}{\gamma_o m_{11} + \gamma_o \gamma_s m_{12} + m_{21} + \gamma_s m_{22}} \quad [6]$$

where $\gamma_o$ and $\gamma_s$ are complex refractive indexes of air and the sample substrate, respectively, and $m_{11}$, $m_{12}$, $m_{21}$ and $m_{22}$ are the elements of the characteristic matrix M. The elements $m_{11}$, $m_{12}$, $m_{21}$ and $m_{22}$ can be found by multiplying $M_1$, $M_2$, ..., $M_p$ as shown in Expression [4], and these elements are the functions of thickness d, angles of the reflected lights, and absolute refractive index η. Also, absolute reflectivity R can be found using Expression [2], or R=r·r*, where * represents complex conjugate.

According to the present invention, a theoretical expression for reflectivity given in Expression [6] can be derived as described above, and therefore, after obtaining a graph of reflectivity vs. wavelength by measurement, thickness and reflectivity can be determined by minimizing the error between the computed reflectivity by using the theoretical expression shown in Expression [6] and the measured reflectivity taken from the aforementioned graph of reflectivity vs. wavelength. Move specifically, in Expression [6] above, since the reflectivity r is a nonlinear function of the thickness of a thin film, the thickness d of a thin film can be found given a measured value for r, by assigning a value for the thickness d as an initial starting point, and finding the corresponding value for the reflectivity r by using the theoretical Expression [6], and then, the error between the measured reflectivity value and the theoretically computed value, thereafter by iteratively repeating this process using a new value for the thickness d, can be minimized. Theoretically, this error becomes zero if the measured value for reflectivity match perfectly. In reality, even if the "best" value of the thickness of a thin film to be found above is a true value, there exists an error, in general, between the measured reflectivity value and the computed one. In this case, by using the value of the thickness as an "independent" variable, and by setting an initial value for the thickness as a starting point, the reflectivity can be calculated using Expression [6]. Then, the resultant reflectivity value is compared with the measured value, and then the error is calculated, thereafter the thickness value is changed incrementally to obtain a new error. In this way the error can be minimized by iteratively changing the thickness value incrementally either in the positive direction or in the negative direction until a minimum value for the error is found. By using this process of minimization of error by an iterative trial-and-error method, a "best" value for the thickness can be determined. According to the present invention, since the reflectivity varies with wavelength, the afore-described procedure for minimizing the error is not simple, and in this case minimization should be carried out by minimizing the sum of errors for all wavelength. For such case, a nonlinear minimization method may be used, where the sum of the errors is minimized. As an example, the Lavenberg-Marquradt method for minimizing the sum of squared errors may be used.

As described preciously, refractive index is easily obtained when the corresponding reflectivity is known, and vise versa. However, according to the present invention, in case that the refractive index of a thin film is not known, certain mathematical models such as Cauchy model or Lorentz oscillator model can be used for finding the refractive index distribution of a thin film as a function of wavelength. In case when the refractive index of a thin film is represented, by assumption, by a mathematical model, the error between the theoretical reflectivity value and the computed reflectivity value based upon said model of choice, is expressed as a function of the model coefficients of the model chosen. Therefore, in order to find the optimum model coefficient values, the error between the computed refractive index and the measured refractive index is likewise minimized by using the afore-described iterative trial-and-error method. The values of the model coefficients determined as a result of using an iterative trial-and-error method are the best values for the model used. In other words, the optimum refractive index is determined so as to minimize the error in refractive indices. Accordingly, similarly to the case of measuring the thickness of a thin film, the desired values for the refractive index as a function of wavelength can be obtained by applying afore-described "optimization" method to the error in reflectivities after choosing the coefficients of the chosen refractive index model as independent variables. It should be noted again that the refractive index can be easily derived from the given reflectivity, and vise versa. A nonlinear error minimization method can be equally used as an optimization method described above.

According to the present invention, as described above, in order to "measure" the thicknesses and the corresponding refractive indices of thin films in each pixel region in the two-dimensional array type of light detector, for each value of the measured thickness and refractive index of a thin film, the physical locations corresponding to the measured thickness and refractive index values on the substrate are determined, and as a result the thickness profile and the refractive index distribution of a given pixel region on a substrate are obtained. Therefore, by displaying the information on the thickness profile and refractive index values along with the corresponding physical locations of said pixel region on a substrate either in two-dimensions or in simulated three-dimensions. Particularly, in case of a simulated three-dimensional representation, the results of the measurements of thickness profile on a substrate may be easily and effectively viewed and understood, and also, similarly, the refractive index distribution information on a substrate may be easily and effectively viewed and understood.

According to the present invention, as described previously, the thickness of a thin film at any location within the range of the sight of view of a light detector on a substrate as long as the target region for measurement on the substrate lies within the sight of view of the light detector, when a light detector constructed with a two-dimensionally arranged array type of CCD sensors is used. Accordingly, unlike the existing arts, it is sufficient to move the substrate carrier once so that the target measurement region is positioned within the range of the sight of view of the light detector. That is, as long as the target measurement region lies within the sight of view, the exact location of the target measurement region within the sight of view is determined by the design of the substrate carrier drive. Therefore, the only step to be taken is then to take a measurement at that location. Accordingly, unlike the prior arts described previously a micro-manipulator is not necessary.

In order to carry out the measurement effectively, it is sometimes necessary to measure the thickness and the refractive index of thin films on a specific region or along a given pattern on a substrate. According to the present invention, in such a case, necessary measurements can be easily carried out by means of software changes. In other words, the desired values of the thickness and the refractive index corresponding to the target measurement region on a substrate can be readily obtained by mapping the thickness and the refractive index of thin films obtained through a two-dimensional array type of light detector. Furthermore, the afore-described processes can be carried out by means of software programming.

In the present invention, an apparatus for measuring thickness profile and refractive index of thin films by using the principle of two-dimensional reflectometry and method of measurement utilizing an optical filter wheel 534 in FIG. 5 for the purpose of discriminating the wavelength of reflected light is disclosed. According to the present invention, instead of an optical filter wheel, the structure of a linear variable optical filter such as the one shown in FIG. 8 may be used or a partially circular variable optical filter constructed as the one shown in FIG. 9 may be used, where either the linear variable optical filter or the partially circular variable optical filter may be constructed as either continuously varying wavelength type or discretely varying wavelength type similar to the afore-described optical filter wheel. The partially circular variable optical filter may be constructed as a completely circular type of variable optical filter or a partially circular type of optical filter. Also these optical filter characteristics may be continuously varying wavelength type of variable optical filter or discretely varying-in-steps type of optical filter set. According to the present invention, in FIG. 5 the optical filter wheel 534 rotates with respect to the rotational axis 536, and this rotational motion is controlled by a functional block (not shown) within a control function such as the system control unit 552 or the information processing unit 550.

Furthermore, according to the present invention, referring to FIG. 5, in place of an optical filter wheel 538, a tunable filter 539 (shown as a block of dotted lines) such as a liquid crystal tunable filter or an acousto-optic tunable filter may be used. As an example, the principle of a liquid crystal tunable filter and its representative structure is disclosed by Chrien, t and Chovit, C. ("Imaging Spectrometry Using Liquid Crystal Tunable Filters", by Tom Chrien and Chris Chovit, Jet Propulsion Laboratory, and also Peter Miller, Cambridge Research and Instrumentation, Inc., April, 1993). The principle of an acousto-optic tunable filter and its functional structure is suggested by Brimrose Corporation of America ["Introduction to Acousto-Optics", a Publication by Brimrose Corporation of America, and also AOTF (Acousto-optic tunable filter) Spectroscopy].

Referring to FIG. 5, an incident light traveling through a tunable filter 539, instead of an optical filter wheel, is "filtered" by a tunable filter 539 as a narrow band-pass filter set, where the light passing through the tunable filter 539 is discriminated within said tunable filter controlled by an information processing unit 550 or a system control unit 552, and during which filtering process only a set of specific wavelengths is selected or filtered similarly to an optical filter wheel. Functionally, a tunable filter works same way as an optical filter wheel. However, in case of a tunable filter, the filter works electronically instead of mechanically as in an optical filter wheel, therefore the filtering action is completed in real time in terms of micro-seconds (ms). Accordingly, the measurement time required can be significantly reduced during inspections in a processing line.

Referring to FIG. 5, the measuring apparatus has a functional structure where a reflected light reflected from an optical boundary 520 on a sample substrate to be measured passes through a narrow band-pass optical filter wheel 534, a variable optical filter or a tunable filter 539, and is then projected onto a two-dimensional array type of CCD light detector 542. According to the present invention, since a tunable filter 539 is an electronic filter, the two-dimensional light detector 542 may not be necessary, and furthermore, the filtering function and the signal detection function can be integrated, thereby the functional structure can be designed and constructed much more efficiently.

As afore-described, because refractive index is expressed as a nonlinear function of the thickness of a thin film and thus the refractive index and thickness of a thin film have a nonlinear functional relationship, use of an iterative trial-and-error method for finding an optimum value for the thickness is a practical way of measuring. However, for example, difficulty of finding a local minimum value for the error of refractive indexes within the range of thickness values of a thin film to be measured do exist, due to the fact that more than one minimum value may exist. In this case, the user of said apparatus can choose a thickness value that corresponds to a best reasonable minimum value based on the individual's experience. In such case, according to the present in venation, an ultraviolet light source or an infrared light source may be used. For example, if the thickness of a thin film to be measured becomes thinner, the reflectivity graph in FIG. 3 tends to become "flat" and the reflectivity value has a tendency of getting lowered. More specifically, the minimum value for the thickness of a thin film to be measured is limited to in the range of 100 Å~200 Å when a visible light source is used. On the other hand, in the range of ultraviolet light, the reflectivity graph tends to move forwards the origin. Therefore when an ultraviolet light source is used, the thickness of a thin film can be measured as low as several tens of angstroms. Compared to this, in case that the thickness of a thin film is very thick, the reflectivity graph in FIG. 3 has a tendency of shifting towards the origin, when only an ordinary light source is used, that is, there are many peaks and valleys appearing, in FIG. 3, thereby many local minimum values for the error of reflectivity may exist. Therefore, when an optimization process such as the error minimization method of a nonlinear function is used, the results may have a tendency of not-very-well converging to a global minimum. However, when an infrared light source having a wavelength in the range of several microns is used, the reflectivity graph in FIG. 3 has a tendency of widely spreading, thereby it is easier to find a local minimum value and also the error tends to converge readily, and thus the thickness of a thin film can be easily measured up to several tens of microns.

The afore-described structure of the present invention and its workings is merely to explain the principles and the substance of the present invention, not to limit the principles and basic ideas what so ever. Those who are familiar with the art in this area may readily understand the contents of afore-described detailed description of the present invention and derive their variations easily. Furthermore those who are familiar with the art related to the present invention, should be able to understand the principles as well as the underlying basic ideas, and derive their extensions in a broad sense through the detailed descriptions of the present invention presented above.

Exemplary embodiments of the present invention are described in the following in reference to FIG. 5. An apparatus for measuring thickness profile and refractive index distribution according to the present invention has a schematic structure illustrated in FIG. 5, and consists primarily of an optical unit, a substrate carrier platform 524, 526, 528, an image acquisition and processing unit 542, 546, an image processing unit 548, an image display unit, 554, 556 an information processing unit 550, and a system control unit 552.

The optical unit has a light source 500, a condensing lens 502, an iris 504, a collimator lens 506, (the first collimator lens), a light splitter 508, an object lens 510 (the second collimating lens), an auxiliary lens 530 (the third collimator lens), and an optical filter wheel 534 equipped with a plural of narrow band-pass optical filters 538. The substrate carrier platform 524, 526, 528 consists of three parts; a substrate carrier 524, a substrate carrier drive 526 and a substrate carrier controller 528. The image acquisition and processing unit 542, 546 has a two-dimensional array type light detector 542 and a frame grabber 546. The image display unit 554, 556 has an image recognition unit 554 and a monitor 556. The apparatus also has an image processing unit 548 and an information processing unit 550. Finally, the apparatus has a system controller 552 that controls the entire "system" as well as an input and output interface unit 558 that handles input and output devices such as a printer, a recording device, and an information transmission and receive function.

As described in the detailed description of the Invention section, the apparatus presented here is a general purpose measuring equipment capable of measuring thickness profile and refractive index of thin films over a range of an area instead of a "spot" on a substrate. As a light source, a visible light, an ultraviolet light or an infrared light source can be used. In the best mode described here, a visible light source was used.

The most widely used application of a apparatus disclosed here using a visible light source is to measure the thicknesses of thin films such as photoresist (PR) used in manufacturing semiconductor elements. The thickness of a photoresist film is in general in the range from 0.3 micron up to 3.0 microns. A silicon substrate coated with a photoresist film as a sample substrate, and also a standard substrate with a photoresist film with known reflectivity as a calibration substrate were used.

The optical unit has a very similar structure with a typical microscope. For a light source, for example, a widely used tungsten halogen lamp was used. The intensity of reflected light projected onto a two-dimensional array type of CCD sensors mounted inside a light detector 542, where such reflected light is reflected from a thin film on a standard substrate with known reflectivity placed on a substrate carrier 524, and passes through a narrow band-pass optical filter 538, and then projected onto a light detector 542.

Figure 6:
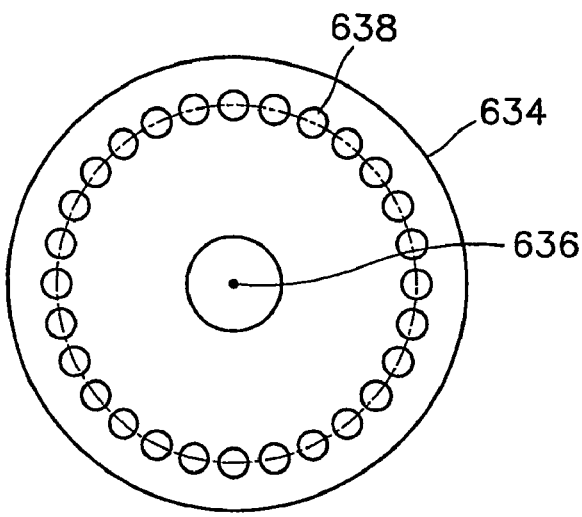
FIG. 6 is an exemplary optical filter wheel equipped with a plural of optical filters.

Next, a sample silicon substrate 514 is placed on a substrate carrier 524, similarly to the case with a standard substrate described above, and the intensity of reflected light was measured by using a light detector 542 with a two-dimensional array type of CCD sensors mounted inside of the light detector 542. During this process the reflected light incident onto the CCD light detector 542 passes through a narrow band-pass optical filter 538 mounted on a narrow band-pass optical filter wheel 534, thereby the reflected light is filtered. Therefore, the measured intensity of the reflected light on a selected area of a sample substrate for measurement is determined by an actual optical filter 538 used, and is given as a function of wavelength. A schematic drawing of a narrow band-pass optical filter wheel 534 used for this embodiment is as shown in FIG. 6. Referring to FIG. 6, the narrow band-pass optical filter wheel 634 used in this best mode contains 28 optical filters 638, and the range of the pass band wavelength of the optical filters 638 covers from 400 nanometers to a maximum of 800 nanometers. At the center of this filter wheel 634, center of rotational axis 636 is positioned. In FIG. 5, this center of rotational axis is numbered 536. The filter wheel 634 or 534 notates with respect to this axis 636, and such rotational movement is controlled by a system controller unit 552. However, this control function may be executed by either the image processing unit 548 or information processing unit 550. This rotational movement of the narrow band-pass optical filter wheel 634 is generally executed by a software, and this rotational movement in steps continues until the measurement of the intensity of reflectivity at the selected region on a sample thin film 520 are completed for all wavelengths. Reflectivity is the ratio of the intensity of reflected light for a given sample substrate and the intensity of incident light measured with a standard calibration substrate, that is, reflectivity=intensity of reflected light/intensity of incident light, and also reflectivity is a function of wavelength. Reflectivity graph obtained from the measured intensity of reflected light is shown in FIG. 7.

Figure 8:
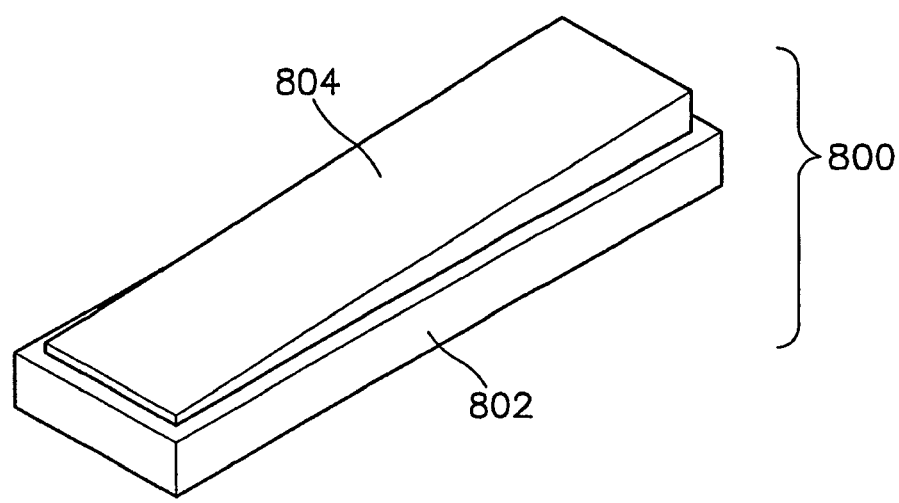
FIG. 8 is a schematic drawing of a linear variable optical filter.
Figure 9:
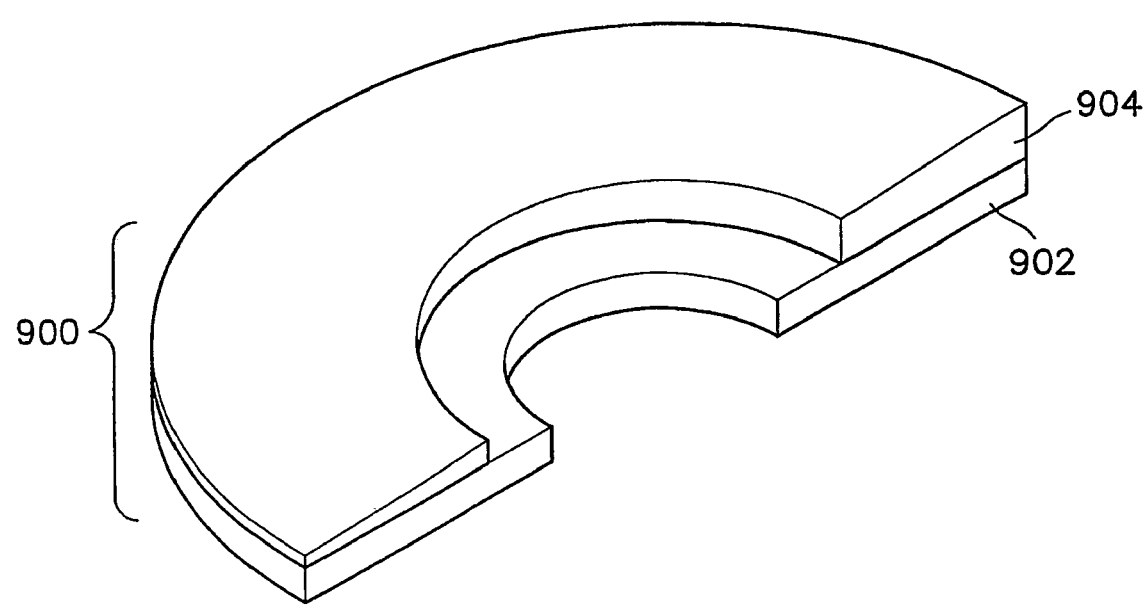
FIG. 9 is a schematic drawing of a partially circular variable optical Filter.
Figure 10:
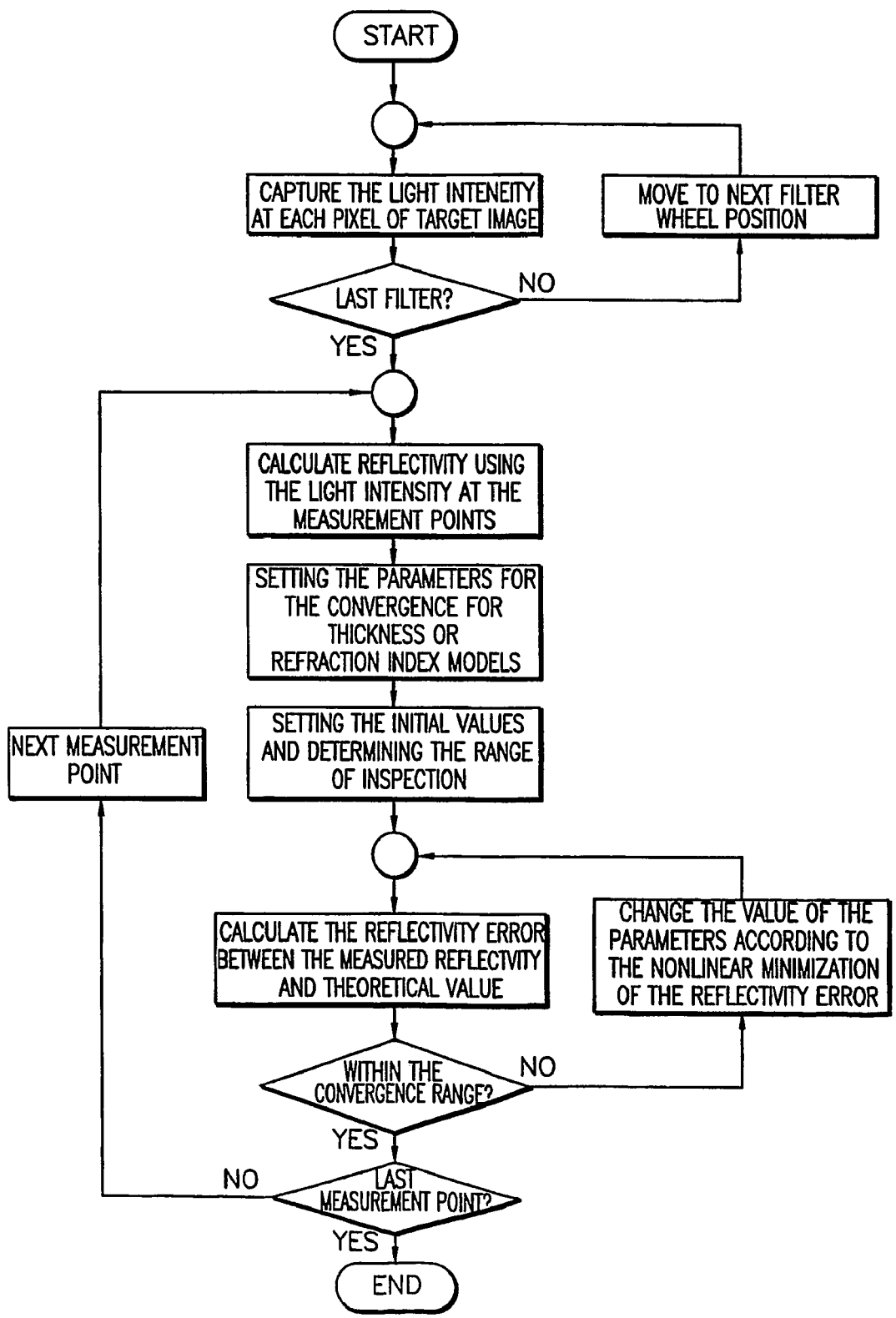
FIG. 10 is a flowchart of the steps for measuring thin film thickness and refractive index using an optical filter wheel.

According to the present invention, in place of a narrow band-pass optical filter wheel 534, a linear variable optical filter 800 shown in FIG. 8 or partially circular variable optical filter 900 as shown in FIG. 9 may be used. Of course, appropriate drive mechanisms for moving these filters are needed, respectively. That is, in case of a linear variable optical filter 800, the linear filter is moved linearly, and a reflected light projected onto a two-dimensional array type of light detector 542 is measured as a function of wavelength. In case of a partially circular variable optical filter 900, the circular filter 900 is rotated similarly to an optical filter wheel 534 or 634.

Furthermore, according to the present invention, a liquid crystal tunable filter 539 or a acousto-optic tunable filter 539 as shown in dotted lines of a block in FIG. 5 may be used. Unlike an optical filter, wherein light passes through a filter directly, a tunable filter 539 is an indirect electronic filter and is used in place of an optical filter wheel 534 as shown in FIG. 5. The principle of a tunable filter is as follows. An incident light into a tunable filter 539 is "filtered" electronically, and only the specific wavelength components of the incident light meeting a pre-set requirement by an information processing unit 550 or a system controller unit 552 are selected or discriminated electronically, whereas functionality-wise, a tunable filter works same way as an optical filter with the exception of its electronic operation. In case of a tunable filter, since the filter function works electronically without any mechanical movements, it takes only micro-seconds for completing a filtering process. Therefore, the measurement time is significantly reduced compared to an optical filter, because it takes much longer to operate an optical filter wheel for covering the entire range of the wavelengths. In addition, according to the present invention, the function of a light detector with CCD sensors 554 can be easily integrated with a tunable filter 539.

As for the physical location of an optical filter or a tunable filter, in order to increase the filter efficiency, a filter can be placed anywhere along the light path 532 between the light source 500 and the light detector 542 where the incoming light is focused. For example, in front of the light source 500, in front of the iris 504 or in the back of the iris 504, above the focal point 512 on a substrate, and the present location of a filter where a filter wheel is located in FIG. 5. Among the potential locations described above, the most desirable place is immediately in front of the light source 500, because the optical noise is minimum and therefore the filter produces "clean" signals, thereby the filter works efficiently. On the other hand, the afore-described possible locations for a filter set are, theoretically, any position between the light source 500 and the light detector 542. However, from practical point of view, any position on the light path between the light source 500 and the light detector 542, where the light is focused, is an effective location for placing a filter set for the reasons of its size, structure and functionality.

For all cases described above, the wavelength of a reflected light passing through each narrow band-pass optical filter is not a single wavelength, but rather many wavelengths covering the range of the narrow pass band of the light passing through it. Therefore, the detected signals at the light detector 542 is an averaged intensity of the reflected lights with many wavelengths within the range of the narrow pass band of a specific filter used. In addition, the afore-described movement of a linear variable optical filter or a partially circular variable optical filter is automatically controlled by means of an automated drive unit for the filter set used, thereby the intensities of reflected lights are measured. Once the intensity of the reflected lights reflected from both a standard calibration substrate and a sample substrate as a function of wavelength are measured, relative reflectivity is obtained by dividing the intensity of the reflected light from a sample substrate with the intensity of the reflected light from a standard calibration substrate. That is, reflectivity=intensity of reflected light from a sample substrate/intensity of reflected light from a standard calibration substrate. As a result, a graph of reflectivity vs. wavelength as shown in FIG. 7 is obtained.

According to the present invention, the optical unit of said apparatus used in this embodiment, is structured similarly to a typical optical microscope, and as a light source, visible light, ultraviolet light or infrared light is used selectively depending upon the need and usage. For this best mode, a visible light source was used for measuring thickness and refractive index. The object lens 510 has an adjustable setting for selecting a multiplication factor, and for this best mode the 50× setting was used. The image captured from a sample substrate has a measurement target area 512 covering an area of about 60 um×80 um on a sample substrate. The reflected light bounced from this measurement target area 512 travels through an object lens 510, a light splitter 508, an auxiliary lens 530 and a narrow band-pass optical filter 538, and then is projected onto the two-dimensional array type of CCD sensors mounted inside the light detector 542, where the intensity of reflected light is sensed and measured. The area of CCD array sensors is equivalent to an area of about 60 μm×80 μm on a sample substrate as explained previously, and within this area a reflected light is sensed with a resolution of 640×480 pixels. The electrical signal generated at the CCD sensors 542 is captured by a frame grabber 546 and stored in a frame memory (not shown). The images stored in the frame memory (not shown) are analyzed by an image processing unit 548, and the intensities of reflected lights are extracted.

More specifically, the basic pixel group unit is defined as (3×3) pixels, called basic image processing unit, and then an image element is also defined as a size of (32×32) pixels, therefore, each image element contains about 121 (11× 11=121) basic pixel group units. The entire range of the CCD sensor area is partitioned using this image element size of (32×32) pixels, thereafter an average intensity of reflected lights over an imaging area of (32×32) pixels is computed for each imaging area and then over the entire range of the CCD sensor area. This process of reflected light intensity sensing, capturing and computing was repeated for each narrow band-pass optical filter 538 on the optical filter wheel 534 to obtain the reflected light intensity values as a function of wavelength over the entire range of the CCD sensor area. These reflected light intensities are divided by the standard reflected light intensities measured in advance using a standard calibration substrate for each wavelength and over the entire range of the CCD sensor area in order to normalize the reflected light intensity of a sample substrate, thereby a reflectivity graph shown in FIG. 7 was obtained. In the best mode of carrying out the present invention presented here, in order to compute the reflected light intensities over the entire range of the CCD sensors totaling 640×480 pixels and for all 28 narrow band-pass filters 538 in the filter wheel 534 used, a basic pixel group unit size of (35×35) pixels was used for partitioning the entire (640×480) CCD sensors, thereby the total number of computations to be carried out is [(640×480)/(35×35)]×28, which amounts to 7022 computations. Therefore, for each picture frame, (640×480)/(35×35) number of reflected light intensity computations were carried out for each wavelength, which is approximately 251 computations per frame. These computational steps were executed in the image processing unit 548.

As described in the section of Detailed Description of the Present Invention, the thickness of a photoresist film on a substrate was measured using an error minimization method, and the necessary computations were executed by the information processing unit 550. According to the present invention, such computations may be alternatively executed by the image processing unit 548. And as aforementioned, the ratio of the measured light intensity of the reflected light from the photoresist film on a sample substrate and the intensity of the reflected light from the photoresis film on a standard calibration substrate as a function of wavelength is plotted to obtain a reflectivity graph as shown in FIG. 7. The values of reflectivity are stored temporarily in a memory (not shown) for subsequent use in computing the thickness of said photoresist film. According to the present invention, the thickness computations can be executed without temporarily storing the reflectivity data. For this best mode, the measured reflectivity data were temporarily stored and then the thickness computations were executed in the image processing unit 548.

According to the present invention, in the Detailed Description of the Invention, Expression [2] is represented as square of the reflectivity in case of a single layer of thin film. That is, the reflectivity is $|r|=\sqrt{R}=\sqrt{r \cdot r^*}$, where r is a complex reflectivity meaning a complex number in Expression [1], and this complex reflectivity r is a function of the thin film thickness d, and also R is absolute reflectivity. In actually computing the thickness of a thin film, the measured reflectivity and the computed reflectivity being called $r_m$ and $r_c = \sqrt{R}$, respectively, the reflectivity error $r_e$ is given by $r_e=|r_c-r_m|=|\sqrt{R}-r_m|$, where $R$, $r_m$, $r_c$ and $r_e$ are all real numbers. As a result, after choosing a value for $d_1$ for initialization of said iterative computation process, and computing the first computed reflectivity $r_{c1}$ using Expression [2], the first error $r_{e1}$ was obtained from the relationship of $r_{e1}=|r_{c1}-r_m|$. Next, after the thickness is changed incrementally, that is $d_2=d_1+\Delta d$ where $\Delta d$ is an incremental value, and the second computed reflectivity $r_{c2}$ is computed, and then the second reflectivity error $r_{e2}$ was computed. Here, if the reflectivity error $r_{e2}$ is smaller than $r_{e1}$, the value of the thickness d is increased further and continue this process until the reflectivity error is minimized. On the other hand, during said iterative computation process, if the reflectivity error increases, then the value of the thickness is decreased and continue the iterative computation process, where a smaller value for $\Delta d$ is chosen. Meanwhile, for the initially chosen value for $d_1$, the second reflectivity error $r_{e2}$ is larger than the first reflectivity error $r_{e1}$, then the thickness value is incrementally reduced and this iterative error computation process is continued. During such iterative error computation process, if the reflectivity error increases, similarly to the computations described above, the thickness value is incrementally increased. This iterative computation process is repeated until a minimum value for the reflectivity error is found, thereby the thickness of the photoresist film is then determined. In executing such iterative trial-and-error method, by using the basic pixel group unit of size (3×3) as described previously as an example, the thickness of said photo resist film corresponding to this basic pixel group unit was computed, and further by carrying out all the computations for all the basic pixel group units over the entire CCD sensor area for all 28 filters, all values needed for the thickness profile measurements of the photoresist film on a sample substrate over the entire range of the light detector 542 were obtained as a function of wavelength. The result was displayed on a monitor 556 as a two-dimensional image and also optionally as a simulated three-dimensional image.

As shown in FIG. 7, the reflectivity is a function of wavelength of reflected light, and an iterative thin film thickness "measurement" process is repeated as many times as the number of filters used. For example, in the best mode of the present invention, 28 filters were used. Therefore 28 sets of computations were carried out, and finally the resultant 28 errors were summed up for determining the final thickness value of the photoresist film on a substrate.

As described previously, the minimum thickness of a thin film that can be measured by using a visible light source is limited to in the range from 100 Å and up to 200 Å. Therefore, if the thickness of a thin film to be measured is less than 100 Å, an ultraviolet light source is preferably to be used for measuring the thickness. That is, the thinner the thickness of a thin film is, the shorter the wavelength of a light source to be used is. The result of thinner film appears as a "dense" graph towards the origin in FIG. 7. When an ultraviolet light source is used, the wavelength of a narrow band-pass filter must become shorter. For example, in the best mode for this invention, the "band" of the wavelength for the 28 filters 538 mounted on the optical filter wheel 534 must be changed towards shorter wavelengths, i.e., the set of filters 538 must be replaced with another set of filters with shorter wavelengths. On the other hand, if the thickness of a thin film to be measured becomes thicker, that is, for example, if it ranges from 5 µm to 10 µm, the thickness measurement becomes easier if an infrared light source is used instead of a visible light source, and in this case, the reflectivity graph in FIG. 7 spreads out from the origin. In this case, the filter set 538 mounted on the filter wheel 534 must be replaced with a new narrow band-pass filter set with longer wavelengths. Remaining steps of image processing whether an ultraviolet or an infrared light source is used are the same as the case when a visible light source is used.

The image information of a substrate received by the image processing unit 548 through the frame grabber 546 is the light intensity sensed by the two-dimensional array type CCD sensors mounted in the light detector 542, where the basic pixel group unit is of the size (3×3) pixels and the actual location of such basic pixel group unit of size (3×3) pixels is defined as the location of such pixel group. The information about the wavelength corresponding to the aforementioned basic pixel group unit is determined by the physical position of the narrow band-pass filters 538 on the filter wheel 534, and such information about the wavelength is directly transferred to the image processing unit 548 or the system control unit 552 from the optical filter wheel 534 through a link between them. In the best mode for carrying out the present invention presented here, the wavelength information was determined by the system control unit 552 since the system control unit 552 controls the optical filter wheel 534. During the image capturing process in the frame grabber 546 described above, the light intensity information of a basic pixel group unit of (3×3) pixels and the corresponding wavelength information are synchronized each other.

In iteratively computing the reflectivity $r_c=\sqrt{R}$ by using Expression [2] with the measured values of the light intensity, the corresponding physical location and wavelength for each basic pixel group unit of size (3×3) pixels as well as the chosen initial value for the thickness of the photoresist film are also needed. Particularly, Expression [2] contains numerous constants and coefficients as well as functions of sine and cosine. Furthermore, the values for $r_c$ are computed iteratively until the reflectivity error $r_e=|r_c-r_m|$ is minimized, thereby many repetitive computations of Expression [2] are required. According to the present invention, in order to reduce the computation time, parts of Expression [2] not changing throughout the repetitive and iterative computing process are computed in parts, and the resulting values are stored in a memory in advance and then are used in a form of a "look-up table", so that the repetitive and iterative computing process may be speeded up. Here, the way that Expression [2] is partitioned for this purpose is dependent upon the skill and experience of the designer of the functions of said apparatus presented here, but such partitions for the apparatus can be designed as user-selectable and menu-driven features.

The afore-described so called "the computational process for minimization" of averaged reflectivity error is rather complex, because such process involves with the steps of computing reflectivity errors as a function of wavelength over the entire range of the wavelength and the steps of minimizing the averaged value of computed reflectivity errors, where reflectivity error is computed for each basic pixel group unit of size (3×3) pixels requiring 3×3=9 pixel operations and over the entire range of CCD sensor area of the size (640×480) pixels, and this process is repeated for 28 times to cover the entire set of optical filters 538 in the filter wheel 534. Furthermore, at the location of a given basic pixel group unit, the corresponding reflectivity error, $r_e$, is a nonlinear function of the thickness and wavelength of the reflected light under measurement, and therefore it is necessary to apply so called nonlinear error minimization procedure iteratively and repetitively. According to the present invention, as an example of a method of nonlinear error minimization procedure, Levenberg-Marquardt's squared nonlinear error minimization method was used. That is, the value of $r_e^2 = |r_c - r_m|^2$ is iteratively minimized. However, a similar error minimization method may be used instead.

In case of the best mode presented here, the refractive index of a thin film on a given sample substrate is known, because the reflectivity of a given layer of known photoresist film is measured. However, sometimes the refractive index of a given thin film is not known. In this case methods of determining the refractive index by using either Cauchy model or Lorentz Oscillator model are disclosed. ("Spectroscopic Ellipsometry and Reflectometry" by H. G. Tompkins and W. A. McGahan, John Wiley, 1999.) When the refraction index of a given thin film is modeled using a specific model described above, the error between the theoretical reflectivity (or refractive index) and the measured reflectivity is expressed as a function of the model coefficients of the chosen model, and the reflectivity error is minimized when the value of a chosen model with given model coefficients is closest to the value of actual refractive index. In this case refractive index is obtained as a function of wavelength by applying a minimization method to the reflectivity error after setting model coefficients as independent variables. As for the optimization method, similarly to the method described previously, a nonlinear error minimization method is used.

The rather complex computation processes as described above are executed by the image processing unit 548 as well as the information processing unit 550, wherein the functions include extraction of measured values of reflectivity necessary for the computation of reflectivity errors, computation of reflectivity error, optimization of the reflectivity, error and computation of a refractive index when the refraction index is not known. However, the functional partition between the image processing unit 548 and the information processing unit 550, mostly by means of software programming, is dependent upon the designer of the system, and further the image processing unit 548 and the information processing unit 550 may be combined as one processing unit by design depending upon said apparatus design requirements and needs. For the best mode presented here, the image processing unit 548 and the information processing unit 550 are represented in two separate functional blocks as shown in FIG. 5. In order to efficiently utilize said look-up tables, it is generally desirable to structure the computational system in such a way that the information processing unit 550 and the image processing unit work very closely in executing their respective functions.

In another aspects of the invention, the signals corresponding to a given basic pixel group unit are extracted by the frame grabber 546 as described previously and then transferred to the image recognition unit 554, where the images of the selected region on the surface of a substrate, that is, the image signals of the surface of a substrate passing through the narrow band-pass optical filters 538 in FIG. 5 are processed, and the original images are reconstructed by the image reorganization unit 554 and displayed through a monitor 556 screen. The apparatus user specifies the desired region for measurement on the monitor screen and the calculations needed for the desired measurements. At this stage, the user may specify a limited region on the surface of a thin film on the sample substrate for measurement in order to reduce the measurement time, and may display only the image for the entire measurement area projected by the lights passing through the narrow band-pass optical filters 538. The image information displayed on the monitor screen 556 includes surface image condition of a substrate, thickness profile of thin films, refractive index distribution, reflectivity distribution, X-Y coordinates of the points of interest in measurement on a surface of a sample substrate, information about the narrow band-pass filter wheel 534, and the multiplication factor for the images of the selected region of measurement among others.

For measuring thickness profile and refractive index distribution of thin films at a plural of the measurement ranges on a substrate, according to the present invention, an auto-focusing feature may be employed for the object lens 510 in the optical unit, whereby the relative positions between the object lens 510 and the substrate 514 in FIG. 5 moves in three (3) directions of X-Y-Z axes, and the substrate carrier 524 loaded with a substrate on it is driven by a substrate carrier drive unit 526 controlled by the substrate carrier platform controller 528.

According to the present invention, the general control of the afore-described apparatus for measuring thickness profile and refractive index distribution of thin films is executed by the system controller 552, which consists of basically either a microprocessor (not shown) or a microcomputer (not shown) or a microcontroller (not shown) and a set of supporting features and functions as well as various memories (not shown) and I/O units (Input and Output). The system controller 552 is divided into mainly a set of hardware and a set of software. The hardware consist of typically a microprocessor, a main memory set, a hard disk, an I/O interface unit, I/O devices such as a printer, a monitor, and communications devices. The software consists of, as an example, primarily an initialization program and a main control program. The system controller unit 552 controls and manages typically many different parts and functions of the thin film thickness and refractive index distribution computations. The apparatus of the present invention consists of an optical unit, a substrate carrier platform controller 528, a narrow band-pass optical filter wheel 534, a two-dimensional array type of CCD sensors mounted on a light detector 542, a frame grabber 546, an information processing unit 550, an image processing unit 548, an image recognition unit 554, a display monitor 556 as shown in FIG. 5 as a typical example, and said measuring apparatus also controls and menages all mechanical movements, complex computations as well as information processing functions.

The afore-described best mode of carrying out the present invention is simply an example for explaining the underlying principles and workings of the present invention disclosed here, and is not for limiting the scope of the basic principles and ideas of the present invention. Those who are familiar with the present art should be able to easily understand and expand the underlying principles and basic ideas of the present invention in a broader sense through the best mode for carrying out the present invention presented here.

The apparatus and method for measuring thickness profile and refractive index distribution of thin films according to the present invention and presented here are to measure said thickness profile and refractive index for a chosen range of areas, thereby a user can view the status and characteristics of thin films in wide perspective in stead of measuring thickness and refractive index at a chosen "spot", i.e., a spot measurement. Therefore, the apparatus and method presented here according to the present invention provide more reliable data compared to a spot measuring means, and also provides much more accurate and useful information compared to the spot measurement, because the apparatus of the present invention measures thickness profile and refractive index over a wide range of measurement area on a substrate. Furthermore, the display monitor of the present invention displays the image of a chosen measurement area either in two-dimensions or in three-dimensions. According to the present invention, as a light source in addition to a visible light source an ultraviolet light source or an infrared light source along with appropriate narrow band-pass variable filter sets can be easily used for measuring thin films either thinner or thicker than the thickness of thin films that can be measured with a visible light source. Furthermore, the speed of measurement of thickness and refractive index measurement is fast compared to a conventional apparatus, because a narrow band-pass optical filter wheel according to one aspect of the present invention works fast compared to using individual filters. Also, according to the present invention, the resolution of the measurement is high, and therefore the local variation of the status of the surface of a thin film can be measured and inspected, by carrying out the computations, in-situ, of the thickness profile and the refractive index distribution for each pixel group and over the entire range of measurement. According to another aspect of the present invention, the surface condition, thickness profile as well as refractive index variation can be inspected and evaluated because the results of thickness and refraction index measurements are displayed as either two-dimensional images or three-dimensional images on a monitor, thereby a user can make a solid and robust judgments about the status and characteristics of a thin film to be measured. Consequently, two-dimensional measurements and representations of the thickness profile and refractive index distribution by using a two-dimensional array type of CCD sensors are much more reliable and contain much more information compared to a conventional spot measurement means according to the present invention.

What is claimed is:

1. An apparatus for measuring a characteristic of a thin film, the apparatus comprising:
   a substrate carrier unit, including:
      a sample carrier for supporting and moving a substrate with a thin film thereon,
      a driving portion for driving the sample carrier, and
      a control portion for controlling the driving portion;
   an optical unit, including a light source, for radiating an incident light onto the substrate supported by the substrate carrier;
   a filter unit for selectively filtering a particular wavelength range of the incident light radiated onto the substrate or of light reflected from the substrate;
   a 2-dimensional photodetector for detecting the light reflected from the substrate in 2 dimensions, the light having the particular wavelength range selected by the filter unit;
   an image capturing unit for obtaining image information included in the reflected light detected by the 2-dimensional photodetector;
   an image processing unit for computing the reflectivities of the thin film with respect to the particular wavelength range of the light using the image information included in the reflective light obtained by the image capturing unit; and
   an information processing unit for computing the characteristic of the thin film based on the reflectivity.

2. The apparatus of claim 1, wherein the thin film formed on the substrate is a single layer or multiple layers.

3. The apparatus of claim 2, wherein the thin film formed on the substrate includes a photo resist layer.

4. The apparatus of claim 1 measuring a characteristic of a particular area of the thin film formed on the substrate.

5. The apparatus of claim 1, measuring characteristics of a plurality of areas in the thin film while moving the substrate carrier.

6. The apparatus of claim 1, wherein the optical unit comprises a source selected from the group consisting of a visible light source, an ultraviolet light source, and an infrared light source.

7. The apparatus of claim 1, wherein the optical unit comprises a condensing lens condensing light radiated from the light source and a diaphragm controlling the size of the light incident on the substrate.

8. The apparatus of claim 1, wherein the filter unit discontinuously filters the particular wavelength range of the light.

9. The apparatus of claim 8, wherein the filter unit is constructed with an optical filter wheel including a plurality of optical filters, each of which selectively filters light having a particular wavelength range, disposed about a shaft of rotation.

10. The apparatus of claim 8, wherein the filter unit is constructed with a tunable filter selectively filtering light having a particular wavelength range.

11. The apparatus of claim 10, wherein the tunable filter is a liquid crystal tunable filter or an acousto-optical tunable filter.

12. The apparatus of claim 1, wherein the filter unit continuously filters the particular wavelength range of the light.

13. The apparatus of claim 12, wherein the filter unit is constructed with an optical filter wheel including a plurality of optical filters, each of which selectively filters light having a particular wavelength range, disposed about a shaft of rotation.

14. The apparatus of claim 12, wherein the filter unit is constructed with a linear variable filter.

15. The apparatus of claim 12, wherein the filter unit is implemented with a circular variable filter or a partially circular variable filter.

16. The apparatus of claim 1, wherein the filter unit is disposed in an optical path between the light source and the 2-dimensional photodetector.

17. The apparatus of claim 16, wherein the filter unit is disposed in the optical path immediately in front of the 2-dimensional photodetector.

18. The apparatus of claim 1, wherein the 2-dimensional photodetector is implemented with a charge coupled device (CCD).

19. The apparatus of claim 1, wherein the image processing unit plots a graph of reflectivity versus wavelength based on the intensities of the reflected light extracted from the image information captured by the image capturing unit.

20. The apparatus of claim 1, wherein the characteristic of the thin film computed by the information processing unit is selected from the group consisting of a thickness, a thickness profile, and a refractive index distribution.

21. The apparatus of claim 1, wherein the information processing unit computes the characteristic of the thin film using a non-linear error minimization method.

22. The apparatus of claim 1 further comprising an image perceiving unit and a monitor that displays the reflectivities computed by the image processing unit and the characteristic of the thin film computed by the information processing unit.

23. The apparatus of claim 22, wherein the monitor displays the characteristic of the thin film in 2 dimensions or 3 dimensions.

24. The apparatus of claim 23, wherein the monitor displays the characteristic of the thin film in color.

25. The apparatus of claim 1 further comprising a look-up table storing operation parameters and variables that are repeatedly used to elevate the processing speeds of the image processing unit and the information processing unit.

26. The apparatus of claim 1, wherein the image processing unit and the information processing unit are included in one processing unit.

27. The apparatus of claim 1, further comprising a system control unit for controlling the image processing unit, the information processing unit and the substrate carrier control portion.

28. The apparatus of claim 27, wherein the system control unit controls the filter unit.

29. The apparatus of claim 27, wherein the control portion of the substrate carrier unit, the image processing unit, the information processing unit and the system control unit are combined and controlled by one master controller.

30. A method of measuring a characteristic of a thin film, the method comprising:
  locating a substrate with the thin film thereon such that a particular area of the thin film to be measured is properly positioned using a substrate carrier;
  radiating light onto the substrate;
  selectively filtering a particular wavelength range of the light;
  detecting the light that has been filtered and reflected from the substrate in 2 dimensions;
  obtaining image information included in the detected reflected light;
  extracting the intensities of the reflected light from the image information and computing the reflectivities of the thin film, with respect to the particular wavelength range of the light, using an image processing unit;
  computing the characteristic of the thin film using the reflectivities of the thin film using an information processing unit; and
  displaying the characteristic of the thin film on a monitor.

31. The method of claim 30, wherein the computing of the reflectivities of the thin film comprises comparing the intensity of the light reflected from the thin film on the substrate with the intensity of light incident on a reference substrate.

32. The method of claim 30, further comprising moving the substrate and computing the reflectivities of another area of the thin film after the computing of the reflectivities of the particular area of the thin film.

33. The method of claim 30, wherein the computing of the characteristic of the thin film using the reflectivities of the thin film comprises computing a thickness of the thin film using a non-linear error minimization method that minimizes an error between measured reflectivity and theoretical reflectivity.

34. The method of claim 33, wherein a thickness profile and a refractive index distribution of the thin film are computed based on the thickness and the reflectivities of the thin film.

35. The method of claim 30, wherein, in the radiating of light onto the substrate, a shorter wavelength of light is used for measuring a thinner film.

36. The method of claim 35, wherein a minimum thickness of the thin film, measured using visible light, ranges from 100 Å to 200 Å.

37. The method of claim 30, wherein the computing of the reflectivities of the thin Film is repeatedly performed to minimize an error in reflectivity measurement using the intensities of the light radiated onto a group of pixels in the particular region, the position of an image displayed through the pixels, the wavelength of the light radiated onto the pixels, and an arbitrarily defined initial thickness value of the thin film.

38. The method of claim 37, wherein a look-up table is used to save the time for computation.

39. The method of claim 30, wherein, in the selectively filtering of the particular wavelength range of the light, the particular wavelength range of the light is discontinuously filtered.

40. The method of claim 30, wherein, in the selectively filtering of the particular wavelength range of the light, the particular wavelength range of the light is continuously filtered.

41. The method of claim 30, further comprising controlling the substrate carrier, the image processing unit and the information processing unit using a system control unit.

* * * * *